W. & M. H. PATERSON.
MOTOR DRIVEN PLOW TRACTION WHEEL.
APPLICATION FILED MAY 14, 1917.

1,282,119.

Patented Oct. 22, 1918.
2 SHEETS—SHEET 1.

Witnesses
Eugene Holbrook
Mollie Holbrook

Inventors
William Paterson
May H. Paterson

UNITED STATES PATENT OFFICE.

WILLIAM PATERSON AND MAY H. PATERSON, OF OAKLAND, CALIFORNIA.

MOTOR-DRIVEN PLOW TRACTION-WHEEL.

1,282,119.  Specification of Letters Patent.  Patented Oct. 22, 1918.

Application filed May 14, 1917.  Serial No. 168,620.

*To all whom it may concern:*

Be it known that we, WILLIAM PATERSON and MAY H. PATERSON, citizens of the United States, residing at Oakland, in the county of Alameda and State of California, have invented a new and useful Motor-Driven Plow Traction-Wheel.

Our invention relates to improvements in motor driven plow traction wheels. It consists of a wheel having a pluraltiy of triangular blades pivotally attached at one point to the side of the fellies of the traction wheel in the form of sawteeth projecting beyond the face of the wheel around its entire circumference so as to act as tractor blades. These colters or blades are capable of being projected beyond the otherwise smooth face of the wheel or withdrawn to any desired position to suit the condition of the work required. Our invention consists further in the construction, arrangement and combination of elements hereinafter set forth and pointed out in our claim and illustrated by the accompanying drawing, in which—

Figure 1:
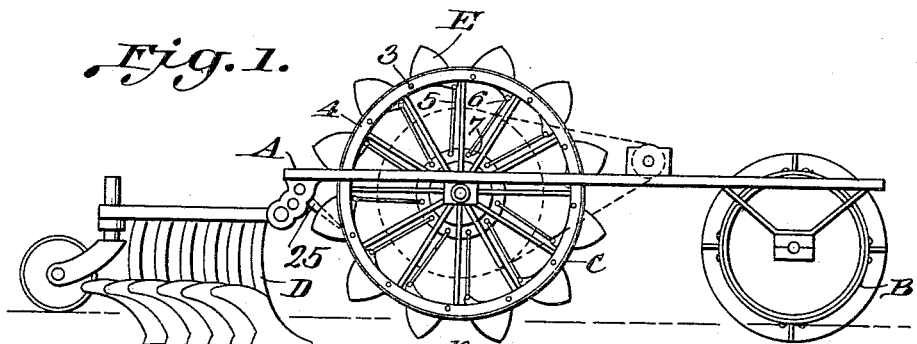
Figure 1 is a side elevation showing our improved traction wheel.
Figure 2:
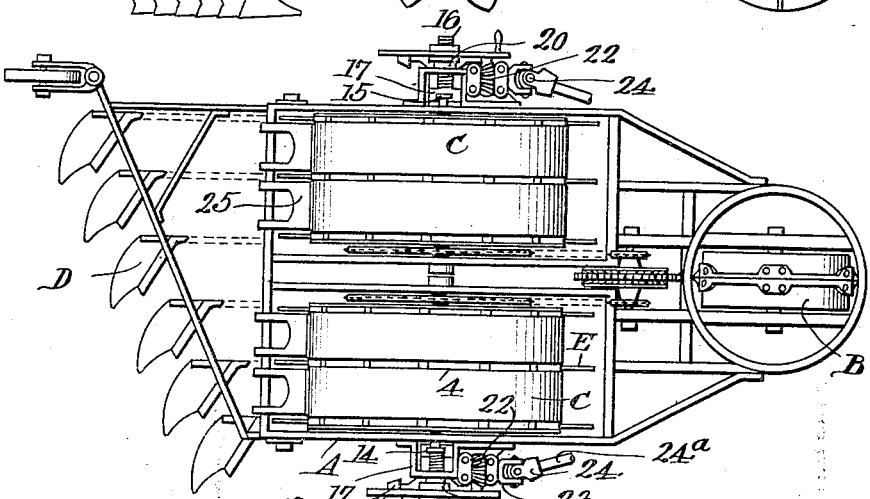
Fig. 2 is a plan view of the same.
Figure 3:
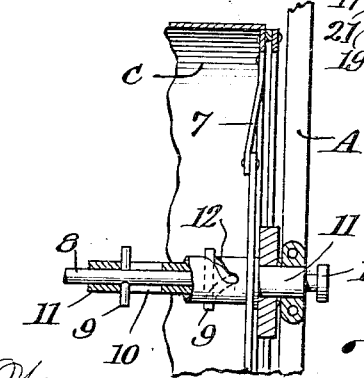

Fig. 3 is a cross section with the colters withdrawn, also showing a hollow axle having a slidable rod inserted therein and having a key fitted transversely through the rod, which key is adapted to slide laterally in longitudinal slots in the hollow axle. Said transverse key projects through said slots into spiral grooves within the sleeve of the combined sleeve and disk which is independently revoluble upon the hollow axle. Said slidable rod has a milled head at its outer end.

Figure 4:
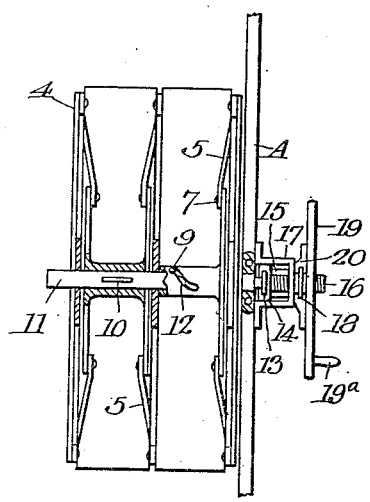

Fig. 4 is a plan view showing the colters withdrawn, housed between the fellies, also showing a bracket attached rigidly to the carriage frame. A cross-head is fitted to move laterally in guides within the bracket, said cross-head having a cavity adapted to receive the milled head of said slidable rod. A threaded rod projects through a smooth bore in the bracket. A corresponding threaded wheel is mounted on the threaded rod and an annular groove on the threaded wheel encircles a collar on the bracket, preventing lateral movement when revolving the wheel. By turning said wheel in either direction the crosshead and slidable rod having the transverse key will move longitudinally and cause the sleeve to revolve by reason of the transverse key sliding along the spiral groove in the sleeve, hence the movement of the outer edge of the disk being transmitted through the connecting rods to the colters. Said colters can be projected or withdrawn or held in any desired position while the traction wheel is in motion. The hubs of the traction wheels are keyed rigid to the hollow axle and the slidable rod revolves synchronously with the hollow axles as does the conjoined sleeve and disk until the threaded wheel is revolved then the disk revolves independently around the hollow axle.

Figure 5:
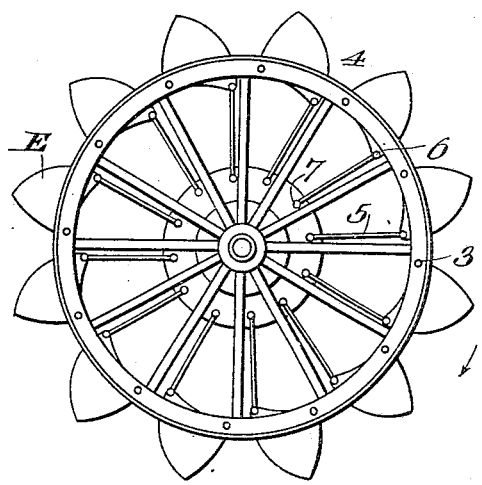

Fig. 5 is a side elevation of the traction wheel showing the colters projected to their full extent, also shows the colters pivotally held by bolt or rivet between the fellies at one point of the blade; another point of the blade or colter is pivotally connected by connecting rod to the outer edges of sleeved disk.

Figure 6:
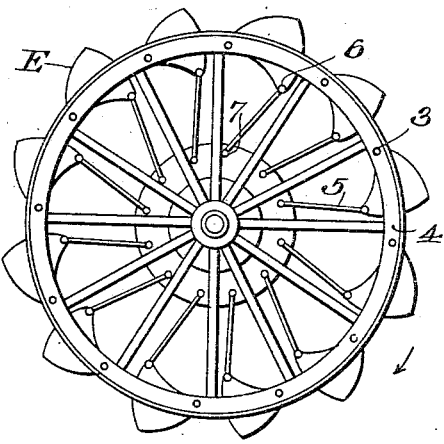

Fig. 6 is a side elevation of the traction wheel with the colters partially withdrawn.

Figure 7:
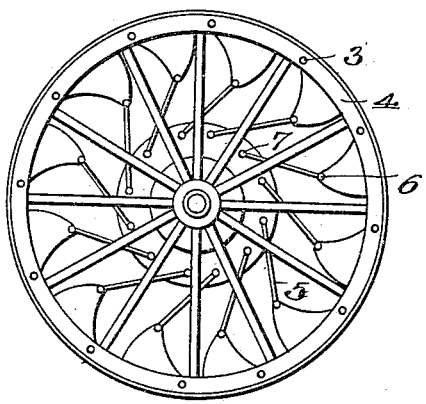

Fig. 7 is a side elevation showing the colters entirely withdrawn.

The objects of our invention are to obtain traction by reason of the blades or colters projecting beyond the face of the traction wheel. A further object is to bring the weight of the traction wheel and its load to bear upon the colters or blades and hence upon the sub-soil rather than upon the surface, thus penetrating the subsoil, bringing new supplies to the crop, providing a receptacle to catch and retain moisture, also acting as under-drainage to prevent the crop from being drowned out.

In the drawing similar letters or numerals refer to similar parts throughout the several views. A represents a carriage frame supported at its forward end by a steering wheel B and at its rear end by the motor driven plow traction wheel C. A gang of plows D are adjustably attached to rear end of frame A. The colters E are pivotally held at one point by bolt 3 between fellies 4 and are connected by connecting rod 5 which extends from the point at 6 and is pivotally connected to edge of sleeve disk 7. The slidable rod 8 has the transverse keys 9 adapted to project through longitudinal slotted holes 10 in the hollow axle 11, each key 9 extending into spiral groove 12 in the interior of sleeve of disk 7. The milled head 13 on the outer end of slidable rod 8 is journaled within the cavity 14 on guided crosshead 15. The threaded rod 16, which is fixed to the crosshead 15, projects through a bracket sleeve 17 having a collar 18 at its orifice; said bracket 17 is rigidly attached to frame A. The threaded wheel 19 is mounted upon the threaded rod 16. The wheel 19 has an annular groove 20 adapted to incase and turn around collar 18, thereby preventing lateral movement of wheel 19 when in operation. The wheel 19 is furnished with a bevel gear enmeshing with a bevel pinion 22 which is mounted upon shaft 23 journaled on bracket 17. A universal coupling 24 enables the operator to revolve the wheel 19 from on board the carriage A through operating mechanism (not shown) connected to shaft 24$^a$ or while standing on the ground by employing the handle 19$^a$ on wheel 19. The scavenger scrapers 25 are adjustably mounted at the rear of the traction wheel C, and conveniently placed between the traction blades E, so as to keep the face of the traction wheel C free from adhering earth or trash of any kind at all times.

What we claim as new and desire to secure by Letters Patent is:—

In a power driven plow traction wheel a series of triangular traction blades arranged in sawtooth form around the entire circumference of an otherwise smooth faced wheel, said colters being pivotally connected at one angle to the felly of said wheel, and mechanism for adjustably and variably projecting beyond and withdrawing said traction blades within the face of the traction wheel while said wheel is in motion, as described and shown and for the purposes set forth in the foregoing specification.

WILLIAM PATERSON.
MAY H. PATERSON.

Witnesses:
E. M. ASMUSSEN,
J. C. WETMORE.

Copies of this patent may be obtained for five cents each, by addressing the "Commissioner of Patents, Washington, D. C."